Aug. 6, 1946.   A. M. DRAKE   2,405,346
WORKHOLDER FOR GAUGE LAPPING MACHINES
Filed July 20, 1942
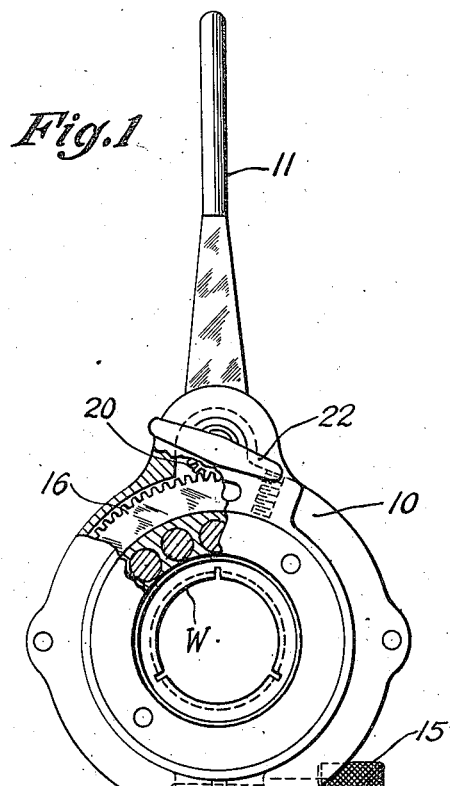
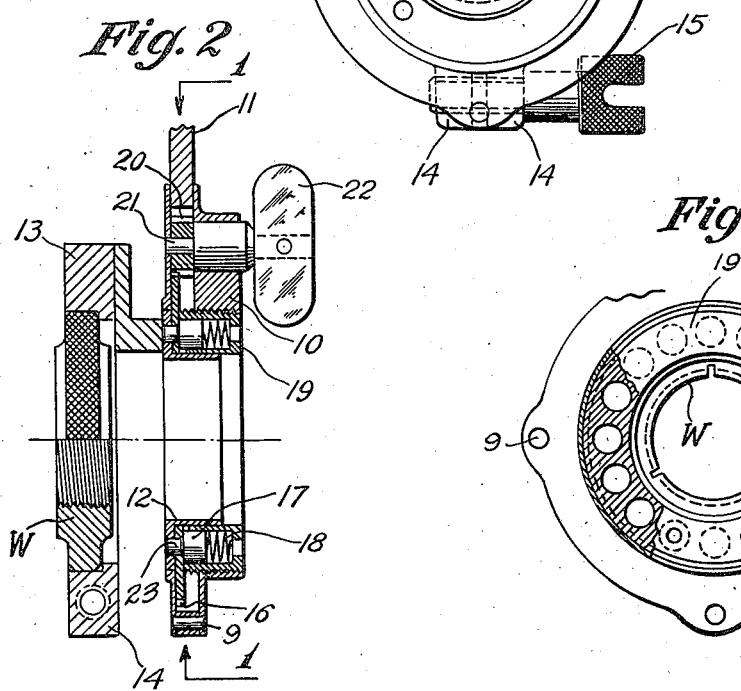
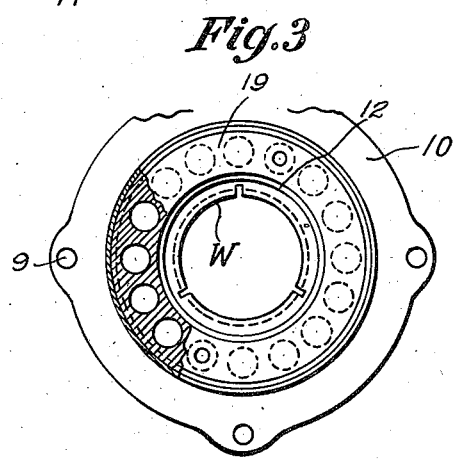
INVENTOR
Alden M. Drake
BY Joseph K. Schofield
ATTORNEY Patented Aug. 6, 1946

2,405,346

UNITED STATES PATENT OFFICE 2,405,346

WORK HOLDER FOR GAUGE LAPPING MACHINES

Alden M. Drake, West Hartford, Conn., assignor to Niles-Bement-Pond Company, West Hartford, Conn., a corporation of New Jersey Application July 20, 1942, Serial No. 451,563

4 Claims. (Cl. 51—217)

This invention relates to gauge holders and particularly to a holder for a tapered screw thread gauge while being lapped.

An object of the invention is to provide a suitable holder for a gauge of the above referred to type while being lapped enabling the angular position of the gauge relative to the body portion of the holder to be readily adjusted.

More particularly the holder is designed for solid screw thread gauges having internal tapered threads, means being provided so that the rotative position of the gauge within the holder may be manually adjustable during the lapping operation.

Another object of the invention is to provide simple manually operated means for angularly varying the position of the gauge within the holder, and to provide frictional means to retain the gauge in its successive angularly adjusted positions.

With the above and other objects in view the invention may include the features of construction and operation set forth in the following specification and illustrated in the accompanying drawing.

In the accompanying drawing annexed hereto and forming a part of this specification, I have shown the invention in a holder for a taper screw thread gauge of the solid ring type, but it will be understood that the invention can be otherwise embodied and that the drawing is not to be construed as defining or limiting the scope of the invention, the claims appended to this specification being relied upon for that purpose.

In the drawing:

Figure 1 is a front elevation of a gauge holder made in accordance with the present invention, parts being broken away substantially on the line 1—1 of Fig. 2 to more clearly show the interior construction.

Fig. 2 is a transverse central sectional view of the holder and gauge shown in Fig. 1, and Fig. 3 is a fragmentary view of the frictional retaining means employed in the gauge holder, parts being broken away to more clearly show their construction.

In the above-mentioned drawing there has been shown but one embodiment of the invention which is now deemed preferable, but it is to be understood that changes and modifications may be made within the scope of the appended claims without departing from the spirit of the invention.

Briefly and in its preferred aspect the invention may include the following principal parts: First, a body member having an arm preferably formed integrally thereon and extending radially therefrom; second, a rotatable member having portions housed within the body member and adapted to be angularly adjustable about the central axis of the holder; third, gauge clamping means provided on the rotatable member enabling a gauge to be clamped thereto with its axis alined with the axis of rotation of the rotatable member; fourth, frictional retaining means for the rotatable member housed within the body member; fifth, a gear mounted on and rotatable wtih the gauge clamping member; and sixth, a pinion supported within the body member and engaging the gear so that the pinion may be manually actuated to vary the angular position of the rotatable member relative to the body member and its arm.

Referring more in detail to the figures of the drawing, I provide a gauge holder generally similar in form to that shown in my patent for a Screw thread lapping machine No. 2,335,745, granted November 30, 1943. The present gauge holder is similar to that disclosed in my earlier application designed particularly for holding tapered screw thread gauges, which comprised a body member 10 having an arm 11 outstanding therefrom by means of which the entire holder could be oscillated. A gauge W was clamped within a portion of the holder but no means were provided for conveniently advancing the gauge along the lap during the lapping operation and as the screw threads increased in diameter. The present form of holder provides means for varying the angular position of the gauge W during the progress of the lapping operation relative to the body member 10 of the holder and its radial arm 11 by means of which the gauge may be gradually advanced along the threaded lap to portions of increased diameter. As shown in the figures of the drawing the body member 10 may comprise two members maintained in spaced relation to each other by suitable rivets 9.

Housed within a cylindrical recess in the body member 10 is a rotatable member 12. This rotatable member 12 has a portion 13 formed integrally therewith or welded thereto for receiving and clamping the gauge being lapped. As shown most clearly in Fig. 2, the gauge clamping portion of this rotatable member 12 comprises two semi-circular portions 14 which may be drawn together by means of a suitable screw 15 to firmly engage the periphery of the gauge. The clamping screw 15 is shown in Fig. 1, but has been removed in the showing of Fig. 2. When in clamped position the gauge W is retained in the rotatable member 12 with the axis of its screw threads alined with the axis of rotation of the rotatable member.

In order to adjust the angular or rotative position of the gauge clamping member 13 and the gauge W retained therein relative to the body member 10 during operation a gear 16 is formed on or riveted to the rotatable member 12 concentric to its axis of rotation. In the drawing the gear 16 is separate from the member 12 and is fastened thereto by rivets 23. Also frictionally bearing against a portion of this rotatable member 12 are a plurality of spring pressed plungers 17 housed within recesses angularly disposed within the body member 10. These plungers 17 and their springs 18 may be retained in position by a ring 19 threaded on to the body member 10.

In order to rotate the member 12 to which the gauge W being lapped is attached a pinion 20 is rotatably mounted within the body member 10 upon a short shaft 21 extending in a direction parallel to the axis of rotation of the rotatable member 12. This pinion carrying shaft 21 is provided with a suitable handle 22 at its opposite end which may be actuated to manually rotate the pinion 20 and thereby angularly adjust the gauge W relative to the holder 10 and its arm 11.

In operation a gauge W is clamped within the clamping portion 13 of the rotatable member 12 and the gauge W is fitted over a tapered screw threaded lap as shown in the above referred to application. While so mounted in position the holder, by means of its arm 11, is oscillated through any predetermined angle by suitable actuating means such as those described in the above referred to application. As the lapping operation proceeds and the screw threads within the gauge W being lapped increase in diameter the pinion shaft 21 may be rotated slightly to angularly advance the gauge W upon the lap to portions slightly increased in diameter so that the lapping can be continued progressively until the proper size of screw threads in the gauge is attained.

What I claim is:

1. A holder for work pieces on the lapping spindle of a lapping machine comprising in combination, a body member, a member mounted for rotation therein, work clamping means on said rotatable member, an actuating arm extending from said body member whereby said holder may be oscillated during rotation of the lapping spindle, gear means to rotatably adjust said rotatable member relative to said body member, and means housed within said body member and frictionally engaging said rotatable member to retain said rotatable member in successive adjusted positions, whereby a work piece secured to said rotatable member may be mounted for free adjustment on said spindle and manually advanced therealong.

2. A holder for work pieces on the lapping spindle of a lapping machine comprising in combination, a body member, a member centrally mounted for rotation therein, clamping means on said rotatable member for retaining an internally threaded work piece with its axis in alinement with the axis of rotation of said rotatable member, an actuating arm extending from said body member whereby said holder and threaded work piece may be oscillated during rotation of the lapping spindle, means to rotatably adjust said rotatable member relative to said body member, and means to frictionally retain said rotatable member in successive adjusted positions, whereby a work piece secured to said rotatable member may be mounted for free adjustment on said spindle and manually advanced therealong.

3. A holder for work pieces on the lapping spindle of a lapping machine comprising in combination, a body member, a member mounted for rotation therein, said body member and rotatable member having a central opening extending therethrough, work clamping means on said rotatable member, an actuating arm extending from said body member whereby said holder may be oscillated during rotation of the lapping spindle, gear means to rotatably adjust said rotatable member relative to said body member, and means housed within said body member and frictionally engaging said rotatable member to retain said rotatable member in successive adjusted positions, whereby a work piece secured to said rotatable member may be mounted for free adjustment on said spindle and manually advanced therealong.

4. A holder for work pieces on the lapping spindle of a lapping machine comprising in combination, a body member, a member centrally mounted for rotation therein, said body member and rotatable member having a central opening extending therethrough, clamping means on said rotatable member for retaining an internally threaded work piece with its axis in alinement with the axis of rotation of said rotatable member, an actuating arm extending from said body member whereby said holder and threaded work piece may be oscillated during rotation of the lapping spindle, means to rotatably adjust said rotatable member relative to said body member, and means to frictionally retain said rotatable member in successive adjusted positions, whereby a work piece secured to said rotatable member may be mounted for free adjustment of said spindle and manually advanced therealong.

ALDEN M. DRAKE.